Dec. 22, 1964    M. M. FOURROUX    3,162,513
ABSORBER CONTROL
Filed Jan. 4, 1960
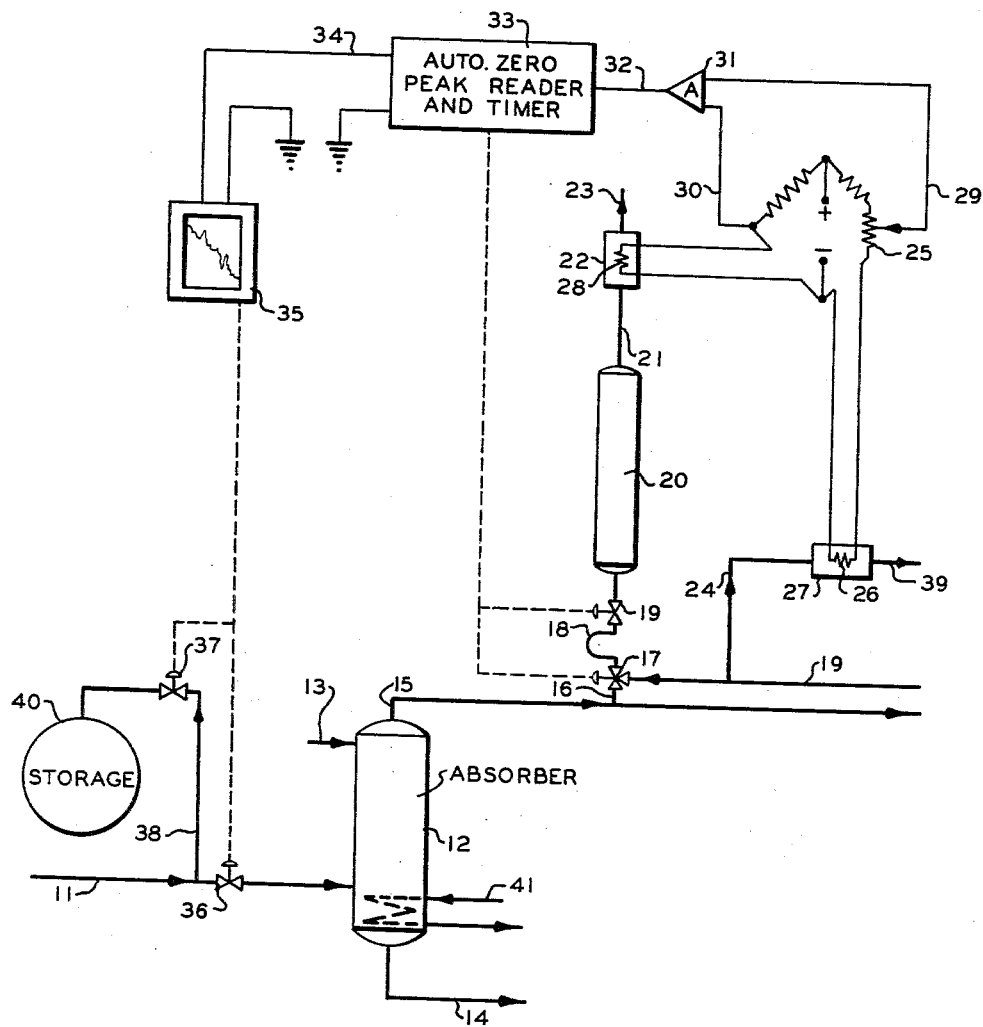
INVENTOR.
M. M. FOURROUX
BY Hudson & Young
ATTORNEYS 3,162,513
ABSORBER CONTROL
Melvin M. Fourroux, Bartlesville, Okla., assignor to Phillips Petroleum Company, a corporation of Delaware
Filed Jan. 4, 1960, Ser. No. 273
4 Claims. (Cl. 55—19)

This invention relates to an improved method of controlling an absorption process. In one specific aspect, it relates to the use of a chromatographic analyzer to directly control an absorption process.

In an absorption process, typical of the prior art, a feed stream is contacted with a lean absorption oil in an absorber. The rich absorption oil is withdrawn from the bottom of the absorber and a residual stream is removed from the top of the absorber. Various methods of controlling an absorption process using the measurement of conventional process variables such as temperatures and pressure are old in the art. This type of control is suitable where operating conditions, including the compositions of the feed, remain substantially constant.

Close control of an absorption process by adjusting the process variables such as temperature and pressure is not possible. Laboratory analysis and plant tests of the product streams are used to supplement temperature and pressure control methods. The time required to conduct these quality control tests must necessarily delay the adjustment of the absorption process dictated by the results of said quality control tests. Therefore, a margin of safety must be included in operating conditions to cover the possibility of operating off-specification between tests.

The importance of this delay is particularly emphasized in gasoline plants where the raw natural gas feed to the absorber is obtained from high and low pressure gas fields. The gas/oil ratio of this raw feed will vary widely. Therefore, a surging type of absorption process develops where after a period of comparatively normal operation and without advance notice, the oil content of the feed to the absorber will surge to a relatively high concentration. Under such conditions the drop-out tanks are overloaded and valuable absorption oil is lost overhead with the residue gas. A present method of detecting this surging condition is to note the loss of absorption oil overhead. To correct the resulting upset condition it becomes necessary to flare the feed stream and thus reduce the influx into the absorber. Under such conditions losses of raw gas feed and absorption oil are necessarily heavy.

Therefore, it becomes important to provide an improved absorption control system that will reduce or eliminate losses of absorption oil and raw feed in the above and similar type absorption processes.

Accordingly, it is an object of this invention to provide an improved absorption process control system. Another object of this invention is to provide an improved absorption control process control system using a chromatographic analyzer. Other objects and advantages will become apparent from the following disclosure and appended claims.

The objects of this invention are realized broadly by using a high speed chromatographic analyzer to analyze the overhead residual hydrocarbon stream from an absorber for the presence of a single component representative of the efficiency of the absorption process.

A high speed chromatographic analyzer employing a single peak reader, and operating on cycles of a minute or less, provides a continuous output signal corresponding to the measurement of the representative component control purposes. M. C. Burk in application Serial No. 727,606, now Patent No. 3,069,895, provides a detailed description of the operation of a high speed chromatographic analyzer.

To briefly outline the operation of the analyzer, sample flows continuously through the analyzer. At a signal from the programmer (control and read out section), a measured volume of sample is flushed into the chromatographic column. All of the components in the sample except the one for which the programmer is set are ignored. When the key component arrives at the detector, the resulting signal is measured, amplified, and stored until the next cycle when the sequence is repeated. The stored signal is a steady, continuous output signal analogous to the amount of the key component present.

An advantage of an absorption process control system employing a high speed chromatographic analyzer over conventional control systems is that losses of desirable product in the residual stream are reduced. In addition, there is a saving in operation cost by permitting the absorber to be operated only as hard as necessary to maintain the minimum product specification.

An advantage of using the high speed chromatographic analyzer, compared with other means for analyzing, is that the chromatographic analyzer can accurately determine the concentration of certain materials in the presence of other materials, e.g., isopentane in the presence of normal and isobutane, and propane. From a practical standpoint, the advantages of this type of analyzer, in addition to its suitability for particular detections, are that it is easier to install, requires less maintenance, and is cheaper and more economical to initially purchase than other types such as refractometers, infrared, and ultraviolet and analyzers or mass spectrometers.

The drawing shows schematically the use of a chromatographic analyzer to control the raw feed to an absorber.

Referring to the drawing, the control of an absorption process will be discussed as it pertains to raw natural gas charged to an absorption column. However, this is not to be construed as an intention to restrict the invention to the instant absorption process. Natural gas, comprising methane through $C_7$'s primarily, is passed by means of a conduit 11 through control valve 36 to an absorber 12. Heat can be supplied to the absorber 12 through a conduit 41. Lean absorption oil is passed to the absorber 12 through a conduit 13. Rich absorption oil is withdrawn from the bottom of the absorber 12 by means of a conduit 14. An overhead line 15 conducts a residue gas consisting of $C_4$'s and lighter components from the absorber 12 for further processing.

A sample is withdrawn from the line 15 through a conduit 16 by means of a sampling valve 17 which is controlled by a timer. The sample must be in the vapor phase or it must be converted to a vapor by conventional pressure and/or temperature means not herein discussed. The overhead residual product in the instant process is in the vapor state at the sample point.

The sample passes through the valve 17 into a sample loop 18 and through a valve 19 into the chromatographic column 20 from whence it is eluted by a stream of carrier gas, such as helium, which is admitted through a conduit 19 and a valve 17. A portion of the carrier gas stream passes through a conduit 24, through a sample cell 27, and is vented through conduit 39. The gas mixture eluted from the column 20 passes through a conduit 21 to a sample cell 22, thence is vented through 23.

A Wheatstone bridge 25 has thermistors, or other temperature sensitive elements 26 and 28, in respective branches thereof and disposed, respectively in sample cells 27 and 22. Leads 29 and 30 conduct the output signals from the bridge to an amplifier 31. The amplifier 31 feeds its output signal through lead 32 to the apparatus 33 designated schematically as the automatic zero, peak reader, and timer. The operation of the automatic zero, peak reader, and timer is discussed by M. C. Burk and F. W. Karasek in "Data Converter Adapts Chromatograph to Process Control" found in the October 1958 issue of the I.S.A. Journal. The particular peak selected by and read by the peak reader is fed through the lead 34 to a recorder-controller 35. In the embodiment shown, the peak reader is sensitized to read isopentane out of the mixture of hydrocarbons sent into the column 20 that appear in the overhead product stream in conduit 15. This peak is used to actuate a flapper valve, or appropriate transducing or electrical apparatus in recorder-controller 35.

The signal from recorder-controller 35 is transmitted by appropriate means to control valves 36 and 37. Valve 36 controls the flow of raw natural gas feed to the absorber. Valve 37 controls the flow of raw natural gas feed to a storage area 40.

When the concentration of raw feed surges to a comparatively high value, indicating an upset condition, the chromatographic analyzer detects the upset condition within 2–3 minutes and operates to reduce the flow of raw feed through valve 36 to the absorber 12. It is within the scope of this invention to provide a surge storage area 40 to which the raw feed may be diverted by means of conduit 38 and through a control valve 37 during the surging operation. Under normal operations with the chromatograph analyzer controlling valves 36 and 37, valve 37 will be in a closed position and valve 36 will be in an open position.

It is also within the scope of this invention to control the absorption process by controlling the rate of flow of raw feed to a surge storage area 40 through a control valve 37. Under these conditions control valve 36 would be removed from the conduit 11.

To further explain and describe the advantages of my invention, the following example is presented which is illustrative only and should not be interpreted to limit my invention unduly.

EXAMPLE I

A single type peak reader chromatograph analyzer was used to control the raw feed to the absorption column of the drawing. Raw natural gas of the composition shown in Table I was charged to the absorber at a rate of 40,000 c.f.d. The feed was contacted in the absorber by a lean absorption oil (kerosene), having a molecular weight of 182 and a specific gravity of 0.802. Absorption oil was passed through the absorber at the rate of 380,350 g.p.d.

The absorber was operated at a top temperature of 95° F. and a bottom temperature of 103° F. Column pressure was 600 p.s.i.g. The composition of the residue gas is shown in Table I.

Table I

| Component | Raw Feed (Mol. percent) | Residue Gas (Mol. percent) |
|---|---|---|
| $CO_2$ | .17 | .18 |
| $N_2$ | 1.80 | 1.97 |
| $C_1$ | 81.08 | 86.47 |
| $C_2$ | 8.98 | 8.26 |
| $C_3$ | 4.94 | 2.98 |
| $iC_4$ | .53 | .08 |
| $C_4$ | 1.40 | .06 |
| $iC_5$ | .33 | |
| $C_5$ | .38 | |
| $C_6$ | .23 | |
| $C_7+$ | .16 | |

The object of the absorption process is to remove all pentanes and heavier components from the natural gas feed. The effectiveness is at once apparent. Analysis of the residue gas and raw gas feed was made using a standard laboratory Podbielniak column. It is noted that no pentanes were found in the residue gas. However, the high speed chromatographic analyzer indicated that isopentanes were present in the residue gas of the concentration of .02 mol percent. This concentration is below that which is possible of detection by the Podbielniak column.

Therefore, an improved method of analysis and subsequent absorption process control is at once apparent with the use of a high speed chromatographic analyzer to control the raw feed to the absorption column.

As will be evident to those skilled in the art, various modifications of this invention can be made, or followed, in light of the foregoing disclosure and discussion without departing from the spirit or scope thereof.

I claim:

1. In an absorption process comprising in combination an absorption zone and a by-pass raw feed surge storage zone, which comprises continuously contacting a raw natural gas feed, primarily $C_1$ through $C_7$ hydrocarbons, with a lean absorption oil in an absorption zone, continuously passing overhead from said absorption zone a residual vaporous stream, continuously withdrawing rich absorption oil from the bottom of said absorption zone; an improvement comprising the analysis of said residual vaporous stream for the presence of $C_5$ hydrocarbons by means of a single type peak reader chromatograph analyzer, and adjusting the rate of flow of said raw natural gas feed to said by-pass surge storage zone in response to said analysis.

2. In an absorption process comprising in combination an absorption zone and a raw feed surge storage zone, which comprises continuously contacting a raw natural gas feed, primarily $C_1$ through $C_7$ hydrocarbons, with a lean absorption oil in an absorption zone, continuously passing overhead from said absorption zone a residual vaporous stream, continuously withdrawing rich absorption oil from the bottom of said absorption zone; an improvement comprising the analysis of said residual vaporous stream for the presence of $C_5$ hydrocarbons by means of a single type peak reader chromatographic analyzer, adjusting the rate of flow of said raw natural gas feed to said absorption zone in response to said analysis so as to maintain the concentration of $C_5$ hydrocarbons in said residual vapor stream substantially constant, and adjusting the flow of said raw natural gas feed to said surge storage zone in response to said analysis.

3. In an absorption control system comprising in combination an enclosed vertical elongated cylindrical vessel, heat exchange means immediately adjacent the bottom of said vessel, a first conduit inlet means in the lower region of said vessel, a second conduit inlet means in the upper region of said vessel, a first conduit outlet means in the bottom of said vessel, a second conduit outlet means in the top of said vessel; an improvement comprising a single peak reader chromatographic analyzer with a sampling means operably connected to said second conduit outlet means, a surge hydrocarbon feed storage means, a surge by-pass conduit means operably connected to said first conduit inlet means and to said surge storage means, a flow control means positioned in said surge by-pass conduit means actuated by said chromatographic analyzing means.

4. In an absorption control system comprising in combination an enclosed vertical elongated cylindrical vessel, heat exchange means immediately adjacent the bottom of said vessel, a first conduit inlet means in the lower region of said vessel, a second conduit inlet means in the upper region of said vessel, a first conduit outlet means in the bottom of said vessel, a second conduit outlet means in the top of said vessel; an improvement comprising a single peak reader chromatograph analyzer with a sampling means operatively connected to said second conduit outlet means, a surge hydrocarbon feed storage means, a surge by-pass conduit means operatively connected to said first conduit inlet means and to said surge storage means, a flow control means positioned in said first conduit means downstream of said surge by-pass means and actuated by said chromatograph analyzing means, and a flow control means positioned in said surge by-pass conduit means actuated by said chromatographic analyzing means.

References Cited in the file of this patent

UNITED STATES PATENTS

| | | |
|---|---|---|
| 2,600,133 | Simms | June 10, 1952 |
| 2,835,116 | Miller | May 20, 1958 |
| 2,875,849 | Edwards et al. | Mar. 3, 1959 |
| 2,942,689 | Wakler et al. | June 28, 1960 |

OTHER REFERENCES

Oil and Gas Journal, "Gas Chromatography," Dec. 17, 1956, pp. 126–140.